Patented June 20, 1950

2,512,582

UNITED STATES PATENT OFFICE 2,512,582

MIXED ALKYL BENZYL PHOSPHATES AND THEIR PRODUCTION

Edwin P. Plueddemann, Woodbridge, N. J., assignor to Food Machinery and Chemical Corporation, a corporation of Delaware No Drawing. Application March 22, 1946, Serial No. 656,541

12 Claims. (Cl. 260—461)

This invention relates to mixed alkyl benzyl phosphates, and more particularly to substantially neutral tertiary alkyl benzyl esters of phosphoric acid wherein the alkyl chain contains at least three and preferably at least four carbon atoms.

In the past trialkyl phosphates and tribenzyl phosphates were generally prepared by the reaction of trisilver phosphate with an appropriate alkyl halide or a benzyl halide. Such reactions have proven to have a number of industrial disadvantages. I have tried to form benzyl phosphates by reacting alkali phosphates such as tripotassium phosphate or dipotassium acid phosphate with benzyl chloride. Such attempts have been entirely unsuccessful. When such reactions were attempted, practically no reaction took place under mild conditions, and under more vigorous conditions the benzyl chloride either decomposed or polymerized, thereby precluding the successful formation of tribenzyl phosphate.

In more recent times trialkyl phosphates have been prepared more conveniently by the reaction of phosphorus oxychloride with aliphatic alcohols under carefully controlled conditions. Several of the trialkyl phosphates have been prepared on a commercial scale in this manner. Certain alcohols, however, such as the tertiary aliphatic alcohols are unsuitable for the preparation of neutral esters by this method because of the great sensitivity of the ester linkages to decomposition in the presence of the hydrogen chloride formed as one of the products of the reaction. Benzyl alcohol, for this application, more closely resembles the tertiary than the primary aliphatic alcohols. Even under carefully controlled conditions the major products obtained from the reaction of benzyl alcohol with phosphorus oxychloride are benzyl chloride and acid phosphates. If one attempts to prepare mixed alkyl benzyl phosphates by the reaction of alkyl chlorophosphates with benzyl alcohol a large proportion of benzyl chloride and acid phosphates are formed and only a poor yield of the neutral mixed esters can be recovered.

I have now discovered that neutral alkyl benzyl phosphates may be obtained in good yield from the reaction of a benzyl halide with the alkali salts of organic acid phosphates. This reaction may be effected at elevated temperatures by warming the reactants together in the presence of a suitable liquid solvent or diluent medium such as an organic solvent or water or a combination of the two.

When preparing mixed alkyl benzyl phosphates, I have found it advantageous to prepare the intermediate alkyl acid phosphates by the reaction of phosphorus pentoxide with about three mols of the desired alcohol. The resulting product is approximately an equimolar mixture of monoalkyl and dialkyl acid phosphates. These acid phosphates may be neutralized with an alkaline material such as sodium hydroxide or potassium hydroxide to give a thick paste of the alkali salts containing about 20 per cent water. The acid phosphates may also be dissolved in a suitable solvent before neutralization to give a more mobile mixture. A portion of the water may then be removed by simple distillation or as an azeotrope with the solvent employed. An excess of a benzyl halide, advantageously benzyl chloride, is then added and the mixture warmed with stirring until precipitation of alkali chloride is substantially complete. A wide range of reaction conditions is possible, but in the presence of large quantities of water and at temperatures below about 120° C. the desired reaction proceeds slowly and the reaction time required is excessive. I have found that temperatures of 120 to 170° C. are especially well suited for the reaction although even higher temperatures may be used if desired. For example, the reaction may be completed at 180° C., the reflux temperature of benzyl chloride.

Under all reaction conditions I have observed that benzyl chloride enters into side reactions with water, solvent, or other materials with the liberation of hydrogen chloride. The hydrogen chloride immediately liberates alkyl acid phosphates from their salts and thus interferes with the reaction of these salts with benzyl chloride. At higher temperatures the liberated acid phosphates decompose and are permanently lost to the reaction. At lower reaction temperatures this decomposition is less serious and the liberated acid may be neutralized by occasional additions of alkali in small portions. I have found, however, that it is possible to run the esterification reaction in the presence of an excess of alkali carbonate. The carbonate is essentially inert to the alkyl phosphates and to benzyl chloride, but will react with acid materials as they are liberated, thus maintaining a neutral or slightly alkaline medium. In the presence of an excess of alkali carbonate I have found that substantially no decomposition of organic phosphates in the reaction mixture results even at temperatures up to 180° C. A method is therefore available for condensing benzyl chloride with the alkyl phosphate salts at a temperature at which a rapid reaction may be obtained.

Solvents may be employed to aid in bringing the alkyl phosphate salts and benzyl chloride into contact. Choice of a solvent with an appropriate boiling range also aids in controlling the reaction temperature. Preferred solvents for the reaction are organic liquids boiling at a temperature above about 120° C. that are miscible with benzyl chloride and that act at least as partial solvents for the alkyl phosphate salts. The solvent also should be relatively unreactive with benzyl chloride. Among such solvents are ketones, alcohols, and esters. Secondary and tertiary alcohols normally are more suitable than the primary alcohols. A particularly appropriate solvent for the preparation of a given alkyl benzyl phosphate is the trialkyl phosphate corresponding to the starting alkyl acid phosphate. For example, tributyl phosphate is an outstanding reaction medium for the preparation of butyl benzyl phosphates from benzyl chloride and salts of acid butyl phosphate. Any side reaction between benzyl chloride and the solvent, in this case, serves only to produce more butyl benzyl phosphates. An excess of benzyl chloride may also serve as solvent in the presence of a small quantity of water. The alkali phosphates are not readily soluble in benzyl chloride, but do come into enough contact for reaction, probably by emulsification, in the presence of water. After a portion of the alkyl phosphate salts have reacted, the esters formed serve as a sufficient solvent and the water may be substantially removed while the reaction is completed.

Various materials have been found to act catalytically in aiding the reaction of benzyl chloride with alkyl phosphate salts. Among these are iodides and other salts of mercury, copper, lead, and silver, as well as pyridine, trialkyl amines, and other organic amines and bases. Fairly complete reaction may be obtained even in the absence of these catalysts, but their presence shortens the necessary reaction time and increases the yield of alkyl benzyl phosphates recovered. Catalysts for the desired condensation also catalyze side reactions of benzyl chloride with resulting liberation of hydrogen chloride. In the absence of excess alkali carbonate this increased rate of acid formation in the presence of catalysts may actually result in a lower yield of neutral ester than in an uncatalyzed reaction. The full value of catalytic activity, however, may be utilized with safety in the presence of an alkaline carbonate.

I have found numerous metal salts of alkyl acid phosphates, especially alkali metal salts, will react with benzyl chloride to form alkyl benzyl phosphates, but I have found that potassium salts are particularly satisfactory. For example, their rate of reaction and the yields of neutral esters obtained are greater than has been observed with sodium salts. However, sodium or other alkali salts may be employed in the manner herein described.

I have surprisingly observed that the salts containing longer alkyl groups react more readily than those containing shorter alkyl groups. Sodium or potassium phosphates themselves undergo substantially little reaction with benzyl chloride under the conditions herein described. Salts of methyl and ethyl acid phosphates are decidedly sluggish in their reaction. Salts of propyl acid phosphates are still somewhat sluggish in their reaction, but such salts as potassium butyl phosphates and potassium octyl phosphates react much more readily. A typical catalyzed reaction with these materials at 130 to 150° C. will have gone substantially to completion in four to five hours. The observed difference in reactivity is probably due to the lesser solubility of the lower alkyl phosphate salts in the organic phase of the reaction mixture, and to the greater ease of hydrolysis of the lower alkyl phosphates in the presence of water.

At the end of the reaction period, the reaction mixture may be washed and the lights removed by distillation or the mixture may be filtered to remove alkali chloride and the organic fraction distilled directly from a small excess of solid base to recover the mixed alkyl benzyl phosphates. Normally the distillation is preferably carried out at subatmospheric pressures. Due to the mixed nature of the product and due to the tendency for radical interchange during prolonged heating, it is usually not practicable to fractionate the product to obtain pure separate fractions of benzyl dialkyl phosphate and dibenzyl monoalkyl phosphate, but purified fractions can be obtained by exercising special controls and by distilling over a narrow temperature range. Some tribenzyl phosphate is also formed during the reaction and distillation, and may remain as a high boiling residue. Tribenzyl phosphate itself generally decomposes before it can be distilled even under a good vacuum, but it may readily be recovered if it is present in appreciable quantities by recrystallization from the still residue after removal of more volatile materials.

The substantially neutral or neutral high boiling mixture of alkyl monobenzyl, alkyl dibenzyl, and tribenzyl phosphates and other complex benzyl phosphates obtained herein is included in the term mixed alkyl benzyl phosphates. Such mixtures have commercial value as a high boiling solvent or plasticizer. Material distillable within a more narrow temperature range may be separated if desired, but ordinarily no chemically pure compounds need be isolated.

The mixed alkyl benzyl phosphates of this invention, particularly those containing from three carbon atoms up in the alkyl chain and especially those containing from four to eight carbon atoms in the alkyl chain, have decided advantages when compared to the most nearly analogous prior art compounds. For instance, when the preferred mixed alkyl benzyl phosphates are used as plasticizers, they have superior characteristics when compared to tribenzyl phosphate, tricresyl phosphate, or trialkyl phosphates. My mixed alkyl benzyl phosphates have improved compatibility with certain resins when compared with any of the mentioned prior art compounds. Ordinarily my mixed alkyl benzyl phosphates, as compared to tribenzyl phosphate, have greater thermal stability, greater compatibilty, lower melting points, and maintain flexibility in plasticized materials at much lower temperatures. Generally speaking, when a comparison is made with the corresponding trialkyl phosphates, my products have higher flash points, decreased oil extractability, and decreased volatility. My products are substantially completely resistant to alkaline hydrolysis and much more resistant than tricresyl phosphate. They are also much more resistant to discoloration by light than the tricresyl phosphate.

A large number of mixed alkyl benzyl phosphates may be prepared by numerous variations of the general process outlined above, and in order to illustrate this invention more clearly, the following examples are given.

Example I

A mixture of butyl acid phosphates was prepared by the reaction of 3 mols of normal butanol with 1 mol of phosphorus pentoxide. Three hundred sixty-three grams of this mixture were neutralized by grinding in a mortar with about 3 mols of solid potassium hydroxide. The resulting paste was transferred to a reaction vessel equipped with a stirrer, thermometer and reflux condenser and refluxed with 630 grams of benzyl chloride for thirty hours. The reflux temperature remained at about 105–110° C. due to the water present in the mixture. Occasional additions of potassium hydroxide were made to keep the reaction mixture neutral. At the end of the reaction period, the product was washed with water to remove precipitated potassium chloride. The organic layer was distilled from 25 grams of sodium carbonate under a pressure of about 5 mm. of mercury. Fractions recovered were approximately as follows:

| Fraction | Boiling Range, °C. | Weight Collected, Grams | Probable Compositions |
|---|---|---|---|
| 1 | to 150 | 150 | benzyl chloride, benzyl alcohol, benzyl ether. |
| 2 | 150–195 | 100 | mainly dibutyl monobenzyl phosphate. |
| 3 | 195–220 | 325 | mainly butyl dibenzyl phosphate. |
| 4 | 220–250 | 50 | tribenzyl phosphate and complex mixed phosphates. |

The total weight of mixed alkyl benzyl phosphates recovered was about 475 grams, which represents a yield of 75 per cent based on the phosphorus pentoxide used.

By following the procedures of this example, I have produced other mixed alkyl benzyl phosphates including amyl benzyl phosphates, octyl benzyl phosphates and others from the salts of the corresponding alkyl acid phosphates. In fact the salts of these higher alkyl esters are more reactive than those of butyl acid phosphoric acid, and the same yield can be obtained in a lesser period of time. Kindred proportions of mixed propyl benzyl phosphate can be obtained by the process of this example by somewhat extending the reaction period.

Example II

Two hundred and eighty grams of butyl acid phosphates such as used in Example I were dissolved in 300 grams of tributyl phosphate and 100 milliliters of toluene and neutralized by adding liquid (48%) potassium hydroxide until a permanent pink color was obtained with phenolphthalein. Water was removed as an azeotrope with toluene until a reflux temperature of about 120° C. was reached. Five hundred grams of benzyl chloride and 50 grams of sodium carbonate were then added and the mixture heated to maintain a reaction temperature of 150 to 160° C. for four hours. At the end of the reaction period the product was recovered as before and distilled under good vacuum. After the removal of low boiling materials, about 300 grams of product boiling between 130 and 160° C. at 5 mm. of mercury pressure was collected. This fraction contained mainly tributyl phosphate and represented a substantially complete recovery of solvent. The receiver was changed and distillation continued to recover 416 grams of product boiling at 160 to 240° C. under 5 mm. of mercury pressure and having a density at 25° C. of 1.070. This represents a yield of 91% based on acid butyl phosphates used. The total recovery of neutral organic phosphates was about 94% of theory.

Example III

A mixture of amyl acid phosphates was prepared by the reaction of 48 grams of phosphorus pentoxide with 88 grams of mixed amyl alcohols derived from pentane and offered to the trade as "pentasol." The resulting amyl acid phosphates were dissolved in 50 grams of triamyl phosphate and neutralized with liquid (48%) potassium hydroxide. One hundred milliliters of toluene was added and the mixture heated with removal of water until a reflux temperature of about 120° C. was reached. Fifty grams of potassium carbonate and 300 milliliters of benzyl chloride were added and the mixture heated to maintain a reaction temperature of 150° to 165° C. for four hours. The reaction mixture was washed with water and the organic layer distilled from 20 grams of soda ash. After removing low boiling materials the main product was distilled at 150° to 245° C. under 5 mm. of mercury pressure and had a density at 25° C. of 1.064. After allowing for complete recovery of triamyl phosphate solvent, 170 grams or 75% of the theoretical yield of mixed benzyl amyl phosphates was recovered.

Example IV

Mixed octyl acid phosphates were prepared by the reaction of 3 mols of octyl alcohol (2-ethylhexanol) with 1 mol of phosphorus pentoxide. One hundred ninety seven grams, or one equivalent of these acid phosphates was mixed with 100 grams of benzyl octyl phosphates and 125 milliliters of toluene and neutralized with liquid (48%) potassium hydroxide. Water was then removed until a reflux temperature of 120° C. was obtained. After adding 10 grams of sodium carbonate, 230 milliliters of benzyl chloride and 2 milliliters of tributyl amine, heating was continued to 155–160° C. for three hours. The crude product was washed and distilled under reduced pressure to give 340 grams of product boiling at 200–230° C. under 2 mm. of mercury pressure and having a density at 25° C. of 1.042. After allowing for complete recovery of the benzyl octyl phosphates used as solvent, an 84% yield of the desired product was recovered.

It will be understood that the embodiments of my invention described and illustrated herein are only representative of the principles of my invention and the agents used therein. Various modifications in the illustrative embodiments of my invention can be made without departing from the scope or spirit of the invention, which is defined in the appended claims.

I claim:

1. A process for making mixed alkyl benzyl phosphates which comprises heating and reacting an alkali metal salt of an acid alkyl orthophosphate with benzyl chloride in the presence of an organic liquid medium, including water in a minor proportion, to distill part of the water and raise the temperature of the reaction mass to between about 120 to 180° C. and continuing the reaction by refluxing at said temperature.

2. A process for producing neutral mixed alkyl benzyl phosphates which comprises heating and reacting an alkali metal salt of an alkyl acid orthophosphate with benzyl chloride in the presence of an alkali and a trialkyl phosphate containing the same number of carbon atoms in its alkyl radical as contained in the alkyl radical of said phosphate.

3. A substantially neutral composition comprising a substantially equal mixture of dialkyl benzyl phosphates and monoalkyl benzyl phosphates wherein the alkyl radical contains 8 carbon atoms.

4. A process for producing mixed tertiary organic phosphates which comprises heating and reacting benzyl monohalide in a liquid medium with an alkali salt of an alkyl acid orthophosphate wherein the salt-forming group is selected from the group consisting of alkali metals and ammonia.

5. A process for producing mixed tertiary organic phosphates which comprises heating and reacting a benzyl monohalide in an organic liquid medium with an alkali metal salt of an alkyl acid orthophosphate.

6. A process for producing mixed tertiary organic phosphates which comprises heating and reacting a benzyl monohalide in an organic liquid medium maintained on the alkaline side of neutrality with an alkali salt of an alkyl acid orthophosphate wherein the salt-forming group is selected from the group consisting of alkali metals and ammonia.

7. A process for producing mixed tertiary organic phosphates which comprises heating and reacting an alkali metal salt of an alkyl acid orthophosphate in an organic liquid medium with benzyl chloride at refluxing temperatures between about 120 and 180° C.

8. A process for producing mixed tertiary organic phosphates which comprises heating and reacting an alkali metal salt of an alkyl acid orthophosphate in an organic liquid medium in the presence of an excess of alkali carbonate suspended in said liquid medium with benzyl chloride by refluxing at temperatures between about 120 and 180° C.

9. A process for producing mixed tertiary organic phosphates which comprises heating and reacting an alkali metal salt of an alkyl acid orthophosphate in an organic liquid medium with an excess of benzyl chloride under alkaline conditions.

10. A process for producing mixed tertiary organic phosphates which comprises heating and reacting a benzyl monohalide in an organic liquid medium with a potassium salt of an alkyl acid orthophosphate wherein the alkyl radical contains at least 3 carbon atoms.

11. A process for producing mixed tertiary organic phosphates which comprises refluxing and reacting an alkali metal salt of an alkyl acid orthophosphate in an organic liquid medium having a boiling point above about 120° C. with benzyl chloride.

12. A process for producing mixed tertiary organic phosphates which comprises mixing phosphorus pentoxide with an aliphatic alcohol in molar ratios of about 1 to 3 to form a mixture of alkyl acid orthophosphates, neutralizing said mixture with an alkali to form an alkali salt of an alkyl acid orthophosphate wherein the salt-forming group is selected from the group consisting of alkali metals and ammonia, and heating and reacting the neutralized mixture in an alkaline organic medium with an excess of benzyl monohalide.

EDWIN P. PLUEDDEMANN.

REFERENCES CITED

The following references are of record in the file of this patent:

UNITED STATES PATENTS

| Number | Name | Date |
|---|---|---|
| 1,844,408 | Nicolai | Feb. 9, 1932 |
| 1,982,903 | Clemmensen | Dec. 4, 1934 |
| 2,005,619 | Graves | June 18, 1935 |
| 2,008,478 | Vanderbilt et al. | July 16, 1935 |
| 2,241,244 | Conary et al. | May 6, 1941 |
| 2,266,514 | Romieux et al. | Dec. 16, 1941 |
| 2,293,445 | Nelson (I) | Aug. 18, 1942 |
| 2,354,536 | Nelson (II) | July 25, 1944 |
| 2,373,670 | Engelke | Apr. 17, 1945 |
| 2,380,400 | Browning | July 31, 1945 |

FOREIGN PATENTS

| Number | Country | Date |
|---|---|---|
| 328,963 | Great Britain | Apr. 30, 1930 |
| 433,927 | Great Britain | Aug. 22, 1935 |
| 145,985 | Switzerland | June 1, 1931 |
| 566,514 | Germany | Dec. 17, 1932 |

OTHER REFERENCES

Zervas, "Naturwissenschaften," vol. 27, (1939), page 317.

Atherton et al., "Jour. Chem. Soc. (London)" vol. 1945, pages 382–385.

"Chemical Abstracts," volume 39, 4596–7 (Oct. 20, 1945), Abstracting Article by Atherton et al. in J. Chem. Soc. 1945, 382–5.